United States Patent [19]

Oka et al.

[11] Patent Number: 4,965,844
[45] Date of Patent: Oct. 23, 1990

[54] METHOD AND SYSTEM FOR IMAGE TRANSFORMATION

[75] Inventors: Masaaki Oka; Yoshitaka Kurauchi, both of Kanagawa, Japan

[73] Assignee: Sony Corporation, Tokyo, Japan

[21] Appl. No.: 845,955

[22] Filed: Mar. 31, 1986

[30] Foreign Application Priority Data

Apr. 3, 1985 [JP] Japan ................... 60-70330

[51] Int. Cl.$^5$ .............................................. G06K 9/00
[52] U.S. Cl. ...................................... 382/44; 358/22; 382/41; 382/50
[58] Field of Search ................ 382/41, 44, 45, 50; 358/22; 340/729, 723

[56] References Cited

U.S. PATENT DOCUMENTS

| | | | |
|---|---|---|---|
| 3,441,789 | 4/1969 | Harrison, III | 340/729 |
| 3,585,628 | 6/1971 | Harrison, III | 340/729 |
| 3,976,982 | 8/1976 | Eiselen | 382/46 X |
| 4,168,488 | 9/1979 | Evans | 364/521 X |
| 4,283,765 | 8/1981 | Rieger | 364/521 |
| 4,475,104 | 10/1984 | Shen | 340/729 |
| 4,484,347 | 11/1984 | Kashioka | 382/46 X |
| 4,570,233 | 2/1986 | Yan | 340/723 |
| 4,594,673 | 6/1986 | Holly | 364/522 |
| 4,604,614 | 8/1986 | Farr | 340/723 |
| 4,615,013 | 9/1986 | Yan | 358/104 |
| 4,622,588 | 11/1986 | Chapuis | 358/22 |
| 4,625,289 | 11/1986 | Rockwood | 382/41 |
| 4,625,290 | 11/1986 | White | 364/521 X |
| 4,653,013 | 3/1987 | Collins et al. | 364/518 |
| 4,682,217 | 7/1987 | David | 340/729 |
| 4,685,070 | 8/1987 | Flinchbaugh | 364/518 X |
| 4,709,231 | 11/1987 | Sakaibara | 340/747 |
| 4,727,364 | 2/1988 | Vorst | 340/729 |

FOREIGN PATENT DOCUMENTS 2119594A 11/1983 United Kingdom .

OTHER PUBLICATIONS

"Image Space Shading of 3-Dimensional Ojbects", Dan Gordon and R. A. Reynolds, Computer Vision, Graphics and Image Processing, vol. 29, No. 3, Mar. 1985, pp. 361-362.

Primary Examiner—Leo H. Boudreau
Attorney, Agent, or Firm—Ronald P. Kananen

[57] ABSTRACT

A method of transforming an input video image data onto a three-dimensional surface is disclosed which comprises the steps of defining the three-dimensional surface, providing mapping data for transforming the input video image data onto the surface, storing the input video image data in a first memory, transforming the input video image data stored in the first memory according to the mapping data so as to provide an output video image data, calculating first vectors representing, respectively, orientations taken by minute areas on the surface, calculating second vectors representing, respectively, directions from the minute areas toward a virtual light source disposed in a position, calculating weighting factors according to the first and second vectors, the weighting factors quantifying shading to be caused on the minutes areas by the virtual light source, and weighting the input video image data or the output video image data according to the weighting factors.

18 Claims, 7 Drawing Sheets

METHOD AND SYSTEM FOR IMAGE TRANSFORMATION

BACKGROUND OF THE INVENTION

1. Field of the Invention

The present invention relates to a method and system for transforming a two-dimensional original picture image into a three-dimensional picture image on a curved surface, and more particularly to the same suited for application to a special-effect apparatus for providing a television signal with special effects.

2. Description of the Prior Art

Figure 1A:
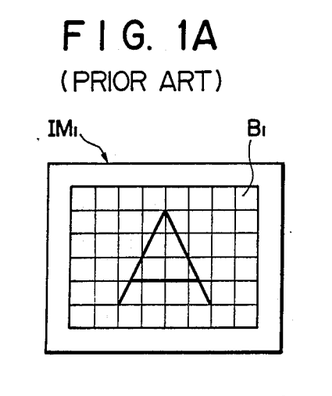
FIGS. 1A and 1B are drawings for explaining image transformation.
Figure 1B:
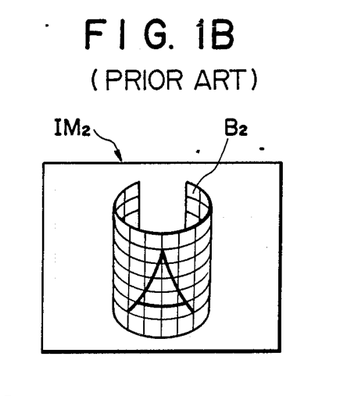

An apparatus for image transformation by means of data conversion of a planar original picture on quadrilateral paper with a character written therein as indicated in FIG. 1A into a three-dimensional picture image having a stereoscopic curved surface as indicated in FIG. 1B in which the paper appears to be rolled on a cylinder is known (refer to Japanese Patent Laid-open No. 58-219664/1983).

Figure 2:
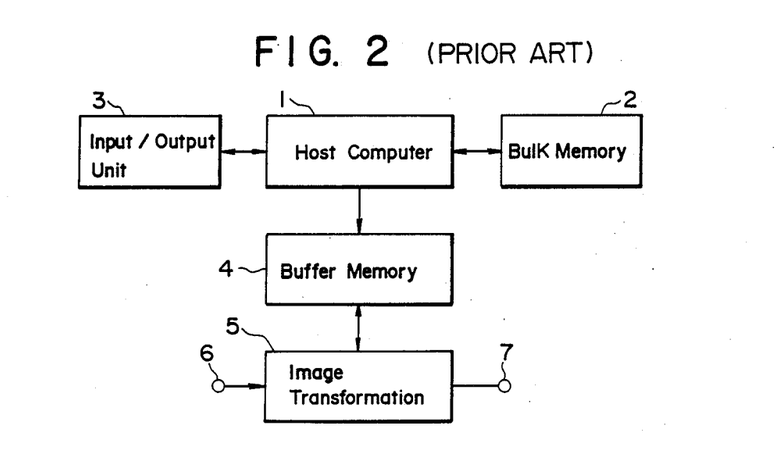
FIG. 2 is a block diagram showing an example of a prior art image transformation apparatus.

FIG. 2 indicates one example of such image transformation apparatus, wherein 1 denotes a host computer formed of a microcomputer and others, 2 denotes a bulk memory, and 3 denotes an input/output unit.

In the bulk memory 2, there are stored transformation programs and other programs prepared in advance such as the one described above for transforming a planar picture image into a three-dimensional picture image in which the planar picture image appears to be rolled on a cylinder. If a selection is made to read the mentioned program by the input/output unit 3, the host computer 1 reads out the same from the bulk memory 2, executes the program, provides necessary data for image transformation as described below, and stores the same in a buffer memory 4.

The process of the image transformation is executed such that the picture image is divided into a plurality of blocks and undergoes the image transformation process block by block. In the present example, the original image $IM_1$ is divided into 64×96 blocks, each block being formed of 8×8 picture elements. The transformed image $IM_2$, on the other hand, is constituted of 128×128 blocks, each block being formed of 4×6 picture elements. The transformed positions in three dimensional directions, namely, X, Y, and Z directions (Z direction represents the depth) are calculated according to the above mentioned program for a representative point of each of the blocks of the original image $IM_1$ and the calculated results are stored in the buffer memory 4. Since, in the present case, the numbers of blocks before and after the transformation are different, the blocks after the transformation do not wholly correspond to the blocks of the input picture image. However, the picture image after the transformation can be determined by the prescription, as indicated in FIG. 1, to what position in the transformed image $IM_2$ (to the position $B_2$ in the case of FIG. 1) the representative point of the block $B_1$ in the original image $IM_1$ should be transformed.

The way in which the data of the picture image after the transformation are obtained is as described in the following.

Figure 3A:
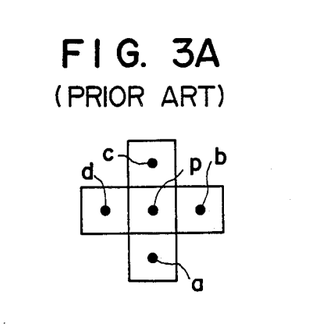
FIGS. 3A and 3B are drawings for explaining the image transformation process in the above mentioned apparatus.
Figure 3B:
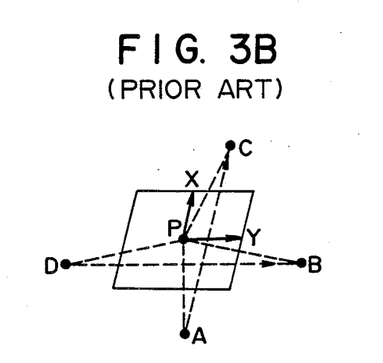

FIG. 3 is an explanatory drawing of the image transformation process. The picture after the transformation of a central block surrounded by representative points a, b, c, and d of four blocks in the original picture image as indicated in FIG. 3A is given by representative points in the circumference of a representative point P as indicated in FIG. 3B. That is, the positions of the points a, b, c, and d after the transformation are first calculated to be the points A, B, C, and D as indicated in FIG. 3B. The position after the transformation of the point p is likewise determined to be the point P.

These points A, B, C, D, and P have three dimensional coordinates, whereby the type of curved surface is to be formed is determined. In the present case, the curved surface after the transformation is given by linear approximation in the vicinity of the representative point as described in the following.

That is, in the linear approximation of the surface including the point P, the orientation of this surface can be defined as a surface in parallel with the segment vector $\vec{AC}$ connecting the point A to the point C and the segment vector $\vec{DB}$ connecting the point D to the point B. Namely, the linearly approximated plane including the point P is defined by a unit vector $\vec{PX}$ in parallel with the vector $\vec{AC}$ and a unit vector $\vec{PY}$ in parallel with the vector $\vec{DB}$. Thus, the entire transformed curved surface is adapted to be obtained by such linear approximation of a surface in the vicinity of each representative point. The values of the vectors $\vec{PX}$ and $\vec{PY}$ are obtained from the following:

$$\vec{PX}=\vec{AC}/4, \vec{PY}=\vec{DB}/4.$$

The buffer memory 4 is written in with data necessary for transformations such as those for applying the transformation to the representative point of each of the blocks in the original image $IM_1$ and calculating the position thereof after the transformation as described above, the difference values, and so on.

These data from the buffer memory 4 are supplied to an image transformation circuit 5, and thus, input image data from a terminal 6 is transformed in accordance with the data from the buffer memory 4 and delivered to an output terminal 7.

In the present case, the image transformation circuit 5, using the data from the buffer memory 4, first designates the area to be transformed. That is, it first defines to what area $B_2$ on the transformed image $IM_2$ an area $B_1$ on the original image $IM_1$ in FIG. 1A should be transformed. According to the defined area, transformation from the area $B_1$ of the original image data to the area $B_2$ of the transformed image is executed. Namely, read addresses for reading out the original image data from an input buffer memory provided in the image transformation circuit 5 corresponding to all the picture elements within the area $B_2$ to be processed are calculated, data are read out from the input buffer memory according to the above read addresses, and the read out data of the picture elements are written in an output buffer memory. These addresses in the output buffer memory in which the image data are written in are the very addresses of the positions after the transformation.

At this time, interpolation for a sample not located in the sampling position of the picture image is performed at the same time, and the interpolated data are also written in the output buffer memory.

To explain what has been described above in brief, the points on the original picture image $IM_1$ corresponding to the 24 (4×6) picture elements of one block of the transformed picture image are first obtained in the image transformation circuit 5, according to which data are read out from the input buffer memory, and the read out sample data, or interpolated data obtained from a plurality of sample data, are written in the address positions after the transformation in the output buffer memory.

In the above case, since the point or read address on the original picture image corresponding to one a representative point of the 24 picture elements is obtained, the points on the original picture image corresponding to the other picture elements can be obtained by obtaining differences between the picture elements using differences from adjacent blocks and by successively adding these differences to the representative point. In other words, in this process, reverse transformation is applied to the transformed data of the picture image $IM_2$ after the transformation so that the points of the picture elements on the original picture image $IM_1$ corresponding to the picture elements on the picture image $IM_2$ are found. If the same do not agree with the sampling point, the data corresponding to the point are obtained by interpolation based on the input picture image data of the circumferential sampling point.

In the described manner, transformation from a two-dimensional, planar picture image to a three-dimensional, solid picture image can be executed.

The above described image transformation apparatus is applied to a special effect apparatus for broadcasting, for example, for producing a special effect of the action of turning a page of a book.

Also, when applied to the output unit of a computer, it can express its output data on a three-dimensional curved surface and help the user in his intuitive understanding.

What is important in such apparatus, however, is how to produce a stereoscopic effect. When the contents of the picture image in the original picture is an irregular one, such as a description of nature, or has no movement therein, such as a still picture, the stereoscopic effect is frequently lost.

The reason why is because what is exhibited is merely a transformed image onto a three-dimensional surface of a two-dimensional picture as it is. In reality, however, shading constitutes an important factor in producing the stereoscopic effect.

There is also another problem in that the accuracy in the calculation cannot be made sufficiently high because the hardware structure to execute the calculation for all the blocks cannot be made sufficiently complex and larger. As a result, it becomes unavoidable that gaps are produced between adjoining parallelograms which are formed by the linear approximate transformation.

To solve this problem, it is first thought that, to provide a special purpose hardware structure having such a high calculating accuracy, produces no such gap. This solution has a difficulty in that the hardware structure will become too huge. In performing transformation of various images, it is not easy to establish suitable bit lengths according to the relative difficulty of the transformation, and it becomes much more difficult when a two-dimensional picture has to be mapped onto an especially complicated three-dimensional curved surface. Such difficulties may be overcome step by step, but it is a problem that a great improvement may not be attained.

As a second solution to the problem of production of the gaps, there is considered a method to pass the output result from the transforming calculation through a low pass filter so that the gaps may become less conspicuous. In this method, however, the frequency band of the output image signal is limited and, from the principle of this method, the transformed image output that is obtained with great effort with a predetermined calculating accuracy becomes blurred, and so, this method has a defect, in essence, in that it causes a deterioration in the quality of the image.

OBJECTS AND SUMMARY OF THE INVENTION

An object of the present invention is the provision of an image transformation apparatus capable of providing an input picture image mapped onto a three-dimensional curved surface with shading in accordance with the form of the curved surface provided thereon to exhibit a stereoscopic effect of the curved surface regardless of the contents of the picture image.

Another object of the present invention is the provision of an image transformation apparatus capable, by a relatively simple structure and within a short calculating time, of detecting gaps formed in the image output produced through a mapping process and interpolating the gaps with appropriate values, thereby to provide a transformed image having practically sufficient accuracy.

To attain these objects, the present invention is adapted such that weighting factors are obtained in the host computer from an output image provided in accordance with a program read out from a bulk memory, the weighting factors providing the output picture image with shading that would appear on the picture image when a virtual light source were disposed in a certain position, and the same are stored in a shading factor memory. The shading factors stored in the shading factor memory are supplied to an image transformation circuit, whereby output image data are delivered as data provided with the weighted shading.

During the execution of the calculation for image transformation, gap data on the gaps that are produced by the mentioned calculation are stored in a gap data memory.

The gap data stored in the gap data memory are supplied to a gap detection and interpolation circuit when output image data are read out from an output frame memory storing the output image after the image transformation in synchronism with the reading out data.

The gap detection and interpolation circuit detects picture elements to be the gaps from the gap data, and at the same time, makes interpolating calculation based on the picture elements surrounding the mentioned picture elements and fills up the gaps with the results of the interpolating calculation.

Thus, a video signal as an output video signal free from gaps can be provided.

DESCRIPTION OF THE PREFERRED EMBODIMENT OF THE INVENTION

A preferred embodiment of the present invention will be described in the following with reference to the accompanying drawings.

Figure 4:
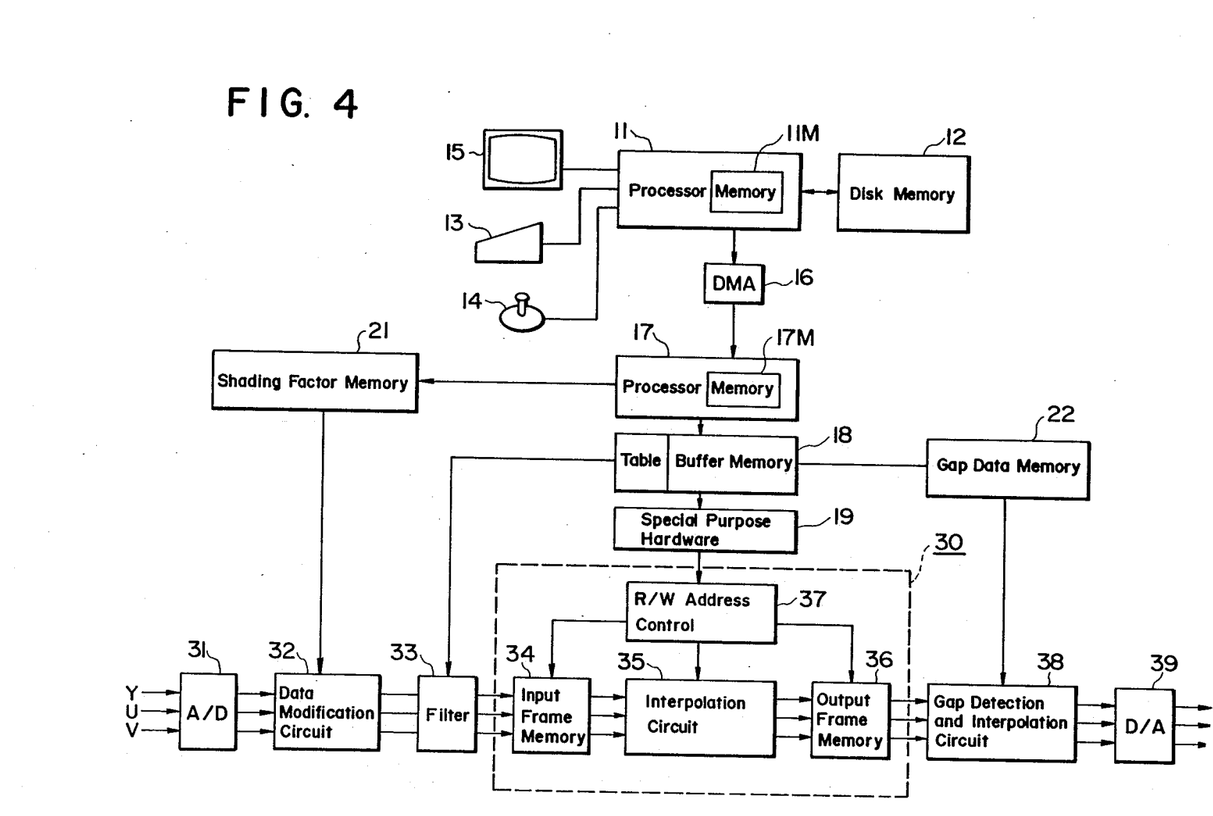
FIG. 4 is a block diagram showing an example of the image transformation apparatus of the present invention.

FIG. 4 shows an embodiment of the apparatus of the invention.

Referring to the drawing, 11 denotes a first microprocessor formed of a microcomputer and a memory and 12 denotes a disk memory as a bulk memory, in which transformation programs from plane figures to solid figures are stored as previously described.

To the first microprocessor 11 are connected a keyboard 13 and a joystick 14 as input devices and a CRT display 15 as an output device.

First, the kind of the image transformation is designated by a key operation on the keyboard 13. For example, an image transformation for transforming a plane picture image into a solid picture image as rolled on a cylindrical surface is designated.

A computer program corresponding to the above designated image transformation process is read from the disk memory 12 into a main memory 11M of the microprocessor 11 and the same is displayed on the CRT display 15.

Then, data representing such as position and orientation of the picture image after the transformation are calculated from the position of the lever of the joystick 14 and parameters in the computer program are thereby altered. The altered program is transferred by a DMA controller 16 to a program memory 17M of a second microprocessor 17. The microprocessor 17 executes the program transferred thereto. By the execution of this program, the previously described transformed positions for the respective blocks, the size of the blocks, $\vec{PX}$ and $\vec{PY}$, after the transformation by linear approximation based on the adjacent blocks, and others are calculated and these data are stored in a buffer memory 18.

Namely, the image transformation in the present example is also executed such that a representative point is defined for each of the blocks of the original picture image $IM_1$, the transformed position of the representative point is calculated, the transformation data of the vicinity of the above mentioned transformed position are obtained by linear approximation with reference to the transformed position, the address positions of the original image data corresponding to the area in the vicinity of the transformed position are obtained, and the image data at these addresses are written in the area in the vicinity of the transformed position.

In displaying a three-dimensional picture image in the above case, it is required not to display the portions hidden from the observing point. Therefore, pointers indicating the order of processing of the blocks are made from the data in the Z direction (the direction of the depth) of the data of the transformed positions for respective blocks and the pointers are written in a table in the buffer memory 18. The order is adapted such that the data transformation is executed, based on the pointers, in the order of processing from the deeper one (further away from the observing point) to the shallower one block by block. As to this method, reference may be made to the previously mentioned Japanese Patent Laid-open No. 58-219664.

The thus-stored data in the buffer memory 18 are read out in the order from the deeper data (in the Z direction) according to the pointers and supplied to special purpose hardware 19. In the special purpose hardware 19, the range of one input block after the transformation is obtained from the transferred position of the block as a unit and the differences. Then, the output block (4×6=24 picture elements) covering the range is found, and by the use of the reverse differences, the point on the original picture image $IM_1$ corresponding to its representative point is obtained for each of the output blocks. The thus obtained data are supplied to image transformation hardware 30.

Reference numeral 21 denotes a shading factor memory, which stores shading factors produced from the transformation data in the microprocessor 17 and representing degrees of reflection of light, coming from a virtual light source previously established, by the surfaces in which each of the image data is located, namely, weighting factors as shading data.

Figure 5:
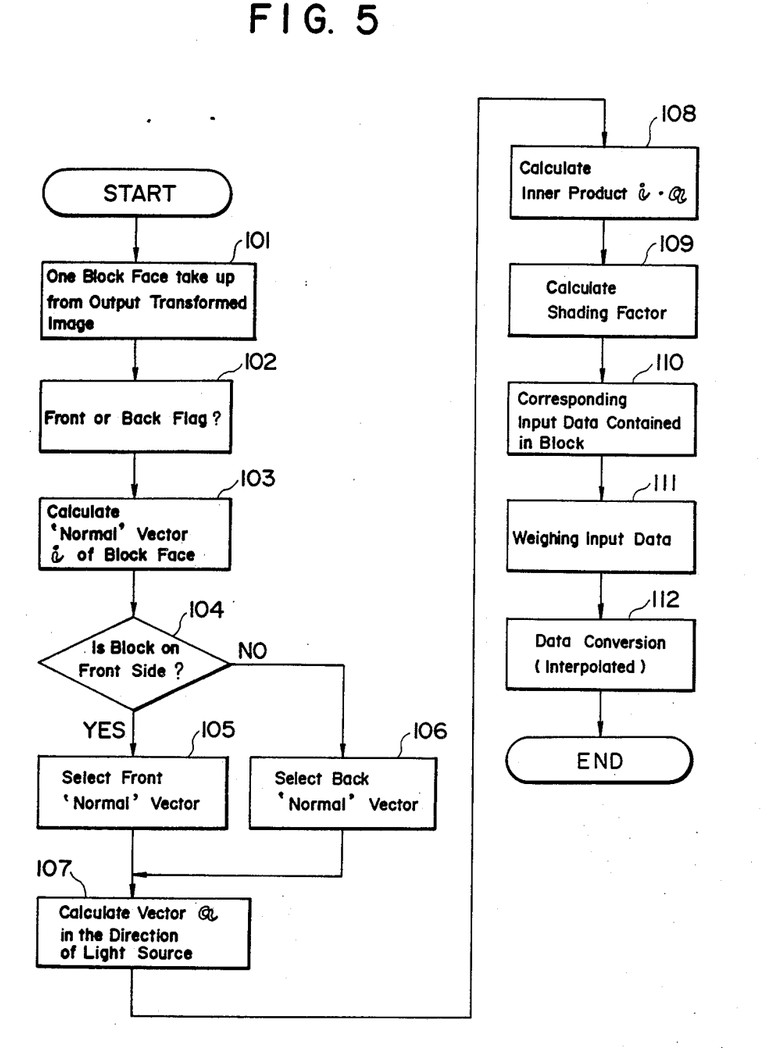
FIG. 5 is a flow chart showing steps of the shading process in the above mentioned apparatus.

FIG. 5 is a flow chart showing the above described image transformation process. Using the same, production of the shading factors and weighting of the input data with the shading factors will be described below in detail.

First, a plane of one block (4×6=24 picture elements) of the transformed output picture image is taken up (step No. 101). In this case, the plane of one block is taken up in the order from the deepest to the next deepest according to the pointers as previously described.

Then, in step No. 102, a flag is set up indicating whether the block corresponds to the front side of the input picture image or the same corresponds to the backside.

Figure 6A:
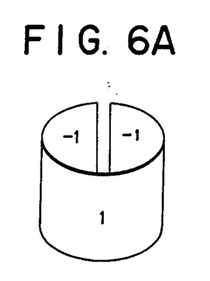
FIGS. 6A, 6B, 6C, 7, 8, and 9 are drawings for explaining the steps of the above mentioned shading process.

When paper is rolled into a cylindrical form as shown in FIG. 6, both the front and back sides come in sight, and when shading for the surfaces is considered, the surface on the front side must be distinguished from the surface on the back side. Therefore, the flag is set up as described above. As seen in FIG. 6A, it is adapted such that a flag "1" is set for a block on the front side and a flag "0" is set for a block on the back side, as shown in vector notation on FIG. 6A as "−1".

Figure 7:
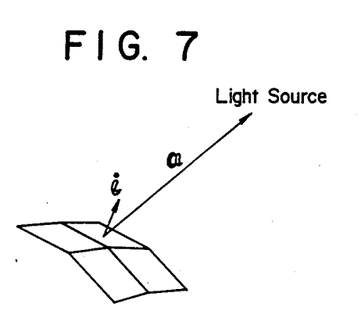

Then, a normal vector i on the taken up block face is obtained as seen in FIG. 7 and from step No. 103 in FIG. 5.

Figure 6B:
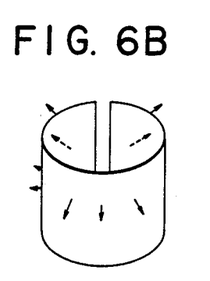
Figure 6C:
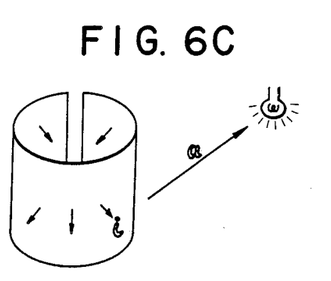

Then, in step No. 104 it is judged whether the block is on the front side or on the back side. If the block is on the front side, the step No. 105 is processed, where a normal vector for the front side is selected as the normal vector i on the block face. If the block is on the back side, a normal vector for the back side is selected as the normal vector i (step No. 106). That is, while those shown in FIG. 6B are unit vectors representing the directions of the normals on the front side, the normal vectors on the front side and those on the back side are provided as shown in FIG. 6C by multiplying the vectors by the flags.

Then, a vector a in the direction of the virtual light source which is disposed in a certain position is obtained for the block, as shown in FIG. 7, at step No. 107. The position of the virtual light source is designated by an operation of the keyboard 13 and the joystick 14.

Further, the inner product i-a of the normal vector i and the direction vector a is obtained (step No. 108). According to the value of the inner product, a shading factor is selected and its value is stored in the shading factor memory 21 (step No. 109).

Then, input data samples corresponding to and included in the output block are obtained from an A/D converter. In the present example, the component signals of the luminance signal Y and the color difference signals U and V are used as the color video signal for the input picture image, and these signals are digitized by the A/D converter 31 and supplied to a data modification circuit 32. Then, the above mentioned shading factor is read out by the microprocessor 17 from the memory 21 and its value is supplied to the data modification circuit 32, wherein the luminance level for the luminance signal and the hues for the color signals are modified according to the shading factor and thereby the data are provided with shading (step No. 111).

Thus, the input data to be included in the blocks of the output picture image are previously weighted with shading factors and the weighted data are transmitted through a filter 33 to the image transformation hardware 30, wherein the data are subjected to data conversion, i.e., address conversion, interpolation, and so on (step No. 112).

Figure 8:
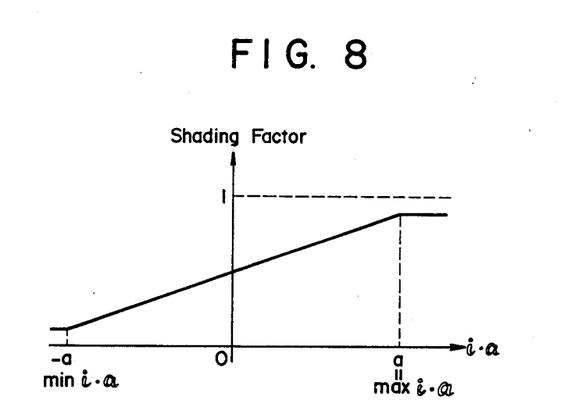

In the above case, it sometimes occurs that those inner products are obtained, on both the front and back sides, that will make such shading factors to be selected that will cause a portion to become the lightest still lighter or make a portion to be the most deeply shaded and darken still darker. However, there are provided the maximum and minimum values for the inner products as indicated in FIG. 8, and the shading factors are limited to be constant if the inner products exceed such maximum and minimum values, or, as it were, there is provided a limiter. Therefore, such things are prevented that a light portion will become glittering and a dark portion will become pitch-dark and the picture will be covered by the darkness.

While the three outputs are supplied through the data modification circuit 32 to the digital filter 33, the pass band of this digital filter 33 is controlled by the output of the buffer memory 18. That is, when the image transformation process is effecting contraction, the signal band is made narrower so that noise will not be increased by the collapse of fine portions in the image. When there are mixed both expanding and contracting areas in the original picture image, the pass bands of the filter are adapted to be switched accordingly.

The output of the digital filter 33 is supplied to the image transformation hardware 30.

The image transformation hardware 30 consists of an input frame memory 34, an interpolation circuit 35, an output frame memory 36, and a read/write address control circuit 37. Transformation data from the special purpose hardware 19 are supplied to the address control circuit 37 whereby addresses in the input frame memory 34 and the output frame memory 36 are controlled and data of the position of the sample point to be processed by interpolation are controlled to be subjected to the interpolation process in the interpolation circuit 35.

Figure 9:
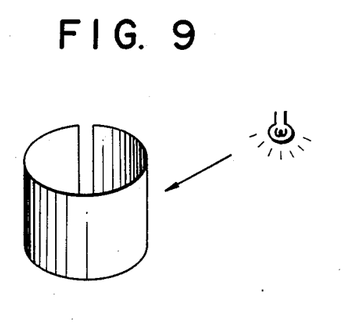

More particularly, the image data passed through the filter 33 are temporarily stored in the input frame memory 34. When processing is advanced block by block from the deeper one to the next one according to the pointers as previously described, the image data of the input sample point corresponding to the representative point of the output block are read out by the address control circuit 37, supplied to the interpolation circuit 35, and written in the output frame memory 36. Then, if the data are for such that the position corresponding to the sample point in the output block is located between sample points in the input frame memory 34, the right data are produced by interpolation based on sample points in the vicinity in the input frame memory 34 and written in the address of the block to become the picture image position output from the address control circuit 37. Thus, there are written in the output frame memory 36 the data of the solid picture image transformed block by block, and these data are read out in succession and supplied through a gap detection and interpolation circuit 38 to a D/A converter 39, wherefrom the luminance signal Y and the color difference signals U and V are taken out to be supplied to a CRT display (not shown), whereby a transformed picture image is displayed on the screen. Referring to FIG. 9, the virtual light source does not appear on the screen.

As described above, the weighting operation with the shading factor is performed in the data modification circuit 32. However, this weighting operation may be done over the video image data stored in the output frame memory.

Now, the interpolation process for the gaps produced by the linear approximate image transformation will be described.

The transformed image data written in the output frame memory 36 are successively read out and supplied to the gap detection and interpolation circuit 38 as described above, and at the same time, mapping data from the buffer memory 18 are supplied to the gap data memory 22 and the gap data with reference to each picture element are supplied to the gap detection and interpolation circuit 38.

The gap data memory 22 includes a write flag memory 22A, a front/back flag memory 22B, and an input image address memory 22C. These memories 22A, 22B, and 22C respectively have a memory area having the same horizontal and vertical addresses as the horizontal and vertical addresses of the picture element data of the output frame memory 36, and it is adapted such that every time the picture element of the output frame memory 36 is read out, their data are read out from the corresponding address in synchronism therewith.

The write flag memory 22A stores the write flag data of one bit indicating whether or not the transformed image data are written in the output frame memory 36 at the addresses corresponding to the picture elements constituting the output picture image. The write flag data indicates, in accordance with the data input to the processor 11 in advance, with flag data of logical "1" and "0" levels, for each picture element, the addresses at which the polygon-simulated curved surface was allocated (logical 1) and the addresses at which the allocation was not made at the time the input picture image was mounted on the polygon-simulated curved surface forming the curved surface of a cylinder of a designated radius, respectively (logical 0). The write flag data, in practice, are produced by calculation based on the data input to the processor 17 and are stored in the write flag memory 22A.

Figure 10:
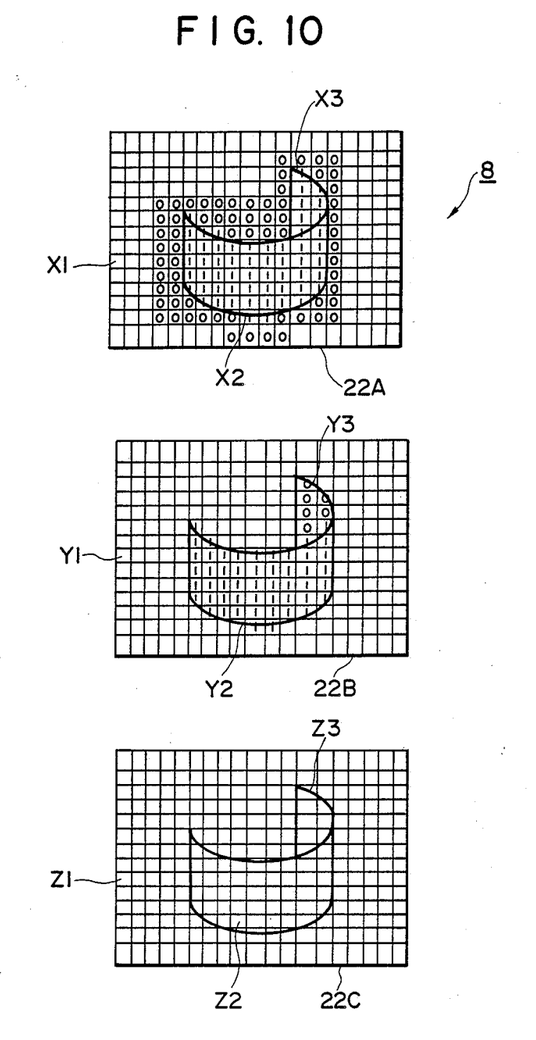
FIG. 10 is a schematic diagram showing the structure of the gap data memory.

In the case of FIG. 10, the address area X1 of the write flag memory 22A is the area that does not belong to the cylindrical surface (but becomes the background) and the area where the polygon-simulated curved surface was not assigned, and so, all the picture elements in the area X1 are written in with the logical "0" data. On the other hand, the address area X2 is the area that corresponds to the front side of the cylindrical curved surface, and this area represents the portion of the picture image transformed such that the picture image in the input frame memory 34 storing the input video signal was mounted on the cylindrical curved surface as the picture image on the front side (not as the picture image disposed inside out) and seen at an angle from above. Further, the address area X3 represents, of the input picture image rolled on the cylindrical curved surface, the transformed image rolled on the back side (namely, the input picture image disposed inside out).

Since the address area X1 is the area where the input picture image was not allocated from the beginning, the addresses corresponding to the picture elements included in this area are written in with the logical "0" data. On the other hand, it follows that the areas X2 and X3 are constituted of the portion on which the polygon-simulated curved surface was mounted and the portion on which the same was not mounted (this portion corresponds to the gaps), and while the addresses to which the polygon-simulated curved surface was allocated are written in with the logical "1" data, the gaps are written in with the logical "0" data.

Figure 11:
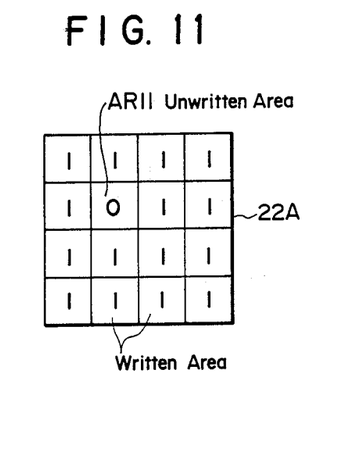
FIGS. 11 to 13 are schematic diagrams showing the manners in which gap data are produced in a write flag memory, a front/back flag memory, and an input image address memory, respectively.

Thus, the position and magnitude of the gap are stored in the write flag memory 22A in such a manner that the address area AR 11 having the logical "0" data therein is left alone with the areas having the logical "1" data surrounding the same as shown in FIG. 11.

The front/back flag memory 22B is for storing data indicating the front side and the back side of the input picture image mounted on the cylindrical curved surface and stores front or back flag data of 1 bit at the address corresponding to the address of the input frame memory 34.

In the case of the embodiment as shown in FIG. 10, the address area Y1 of the front/back flag memory 22B corresponds to the address area of the output frame memory 36 where the input image data are not written. This area is not storing the front/back flag data but written in with a signal indicating nullification. This signal indicating nullification is obtained, in practice, based on the write flags stored in the write flag memory 22A.

In the address area Y2, there are written the logical "1" data at the addresses where the image data on the front side portion is stored within the addresses included in the picture image portion rolled on the cylindrical surface, in accordance with the transformed image data written in the output frame memory 36.

Further, in the address area Y3, there are written the logical "0" data at the addresses where the image data turned inside out representing the portion rolled on the back side of the cylindrical curved surface is stored, in accordance with the input image data written in the output frame memory 36.

Figure 12:
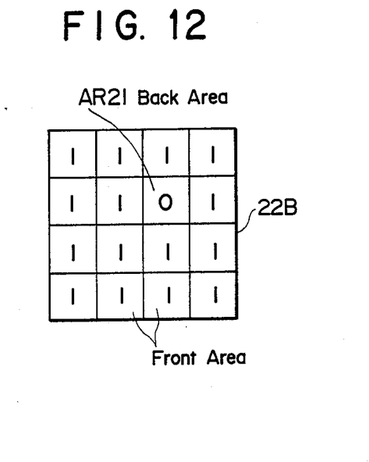

Therefore, in the portion where the address area Y2 in which the image data on the front side are stored in lapped over the address area Y3 in which the image data on the back side are stored, if there exists a gap in the area Y2 for the front side, the data arrangement on the front/back flag memory 22B will become such that the memory area AR21 corresponding to the gap which only is written in with the logical "0" data is surrounded by the memory areas written in with the logical "1" data as shown in FIG. 12.

This means, with regard to the image data stored in the output frame memory 36, that a portion of the picture image which is turned inside out is in a visible state because there is a gap in the area for the front side. In the event of such a state brought about in practice, if the color on the back side and that on the front side are extremely different, for example, there is a danger of the picture becoming disagreeable even if the gap is of only one picture element size. The occurrence of such a state can be stored in the front/back flag memory 22B.

Figure 13:
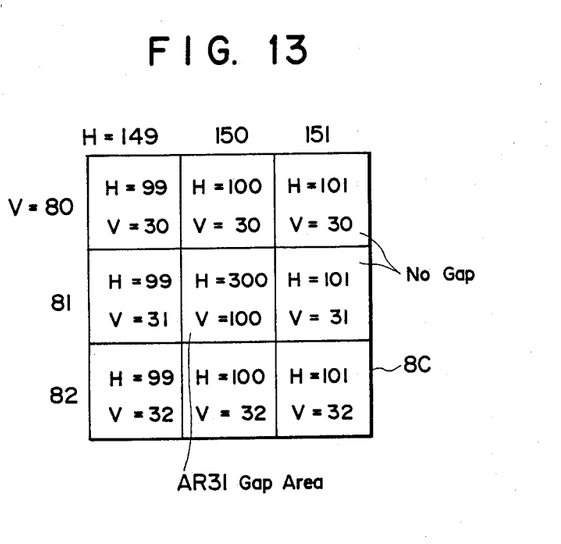

The input image address memory 22C stores horizontal addresses and vertical addresses in the input frame memory 34 storing the input picture image before the transformation in the memory area at the addresses corresponding to the addresses in the output frame memory 36. Here, the address positions of the picture element data stored at the addresses in the output frame memory 36 are such that have been transformed from the address positions in the input frame memory 34 by transforming calculations, and so, the addresses in the input frame memory 34 of the data of the picture elements adjacent to each picture element in the output frame memory 36 cannot be so far apart from each other from the point of view of continuity of the picture. And so, if, as shown in FIG. 13, the address stored in the memory area AR 31 is extremely different from addresses stored in its surrounding memory areas, it can be decided that there is a gap at the address position corresponding to the memory area AR 31.

Thus, the gaps can be obtained as what are known by calculation at the time the two-dimensional plane is mounted on the polygon-simulated curved surface and previously written in the write flag memory 22A, front/back flag memory 22B, and the input image address memory 22C constituting the gap data memory 22. Thereafter, when the data of the picture elements stored at the addresses in the output frame memory 36 are read out in succession, they are read out as gap data in synchronism therewith and supplied to the gap detection and interpolation circuit 38.

In the above, reading data from the write flag memory 22A, the front/back flag memory 22B, and the input image address memory 22C are executed in both the horizontal direction (H direction) and the vertical direction (V direction), and thus, when extreme discontinuities in the arrangement of data of the picture elements both in a horizontal and a vertical direction are detected, it is decided that there is a gap.

Writing data in the write flag memory 22A, front/back flag memory 22B, and the input image address memory 22C constituting the gap data memory 22 is carried out such that the picture image in the deepest position is overwritten by the picture image next closer to the observing point and so forth, so that, at the portion where a plurality of picture portions are overlapping one after another, the data for the picture portion being the closest to the observing point are adapted to remain on the memories 22A, 22B, and 22C.

The gap detection and interpolation circuit 38 makes interpolating calculation to provide the data for the picture element of the above decided gap using the data on the circumference of the picture element of the gap. In the present embodiment, the interpolating value is calculated by the circuit 38 as a middle value (arithmetical mean value) of two such values of the picture element data sent thereto in succession from the output frame memory 36 that are input thereto preceding and following the picture element of the gap. Various mean values other than the middle value can be used as the interpolating value, such as mean values of the picture element data adjacent to the proceding data, the picture element data adjacent to the following data, the picture element data preceding by one field, and eight sets of picture element data on the circumference.

The data of which gaps are interpolated in the gap detection and interpolation circuit 38 are delivered as the output video signal after being converted into analogue signals in the digital/analog converter circuit 39.

Figure 14:
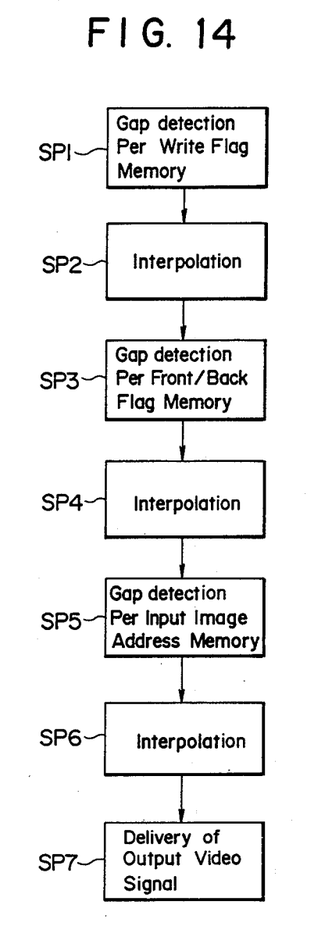
FIG. 14 is a flow chart showing data processing steps in a gap detection and interpolation circuit.

In the above described arrangement, the gap detection and interpolation circuit 38 executes the detection of gaps and interpolating calculation following the processing steps as indicated in FIG. 14. The gap detection and interpolation circuit 38 first, in the step SP1, read out the write flag data from the write flag memory 22A in the horizontal direction and the vertical direction in succession and detects the picture elements that were not written in the output frame memory 36 (FIG. 11) as gaps, and then, in the following step SP2, executes the interpolating calculations based on the above detected results and thereby fills up the gaps with the interpolating data.

The gap detection and interpolation circuits 38 then, proceeding to the step SP3, reads the data in the front-/back flag memory 22B first in the horizontal direction and then in the vertical direction and thereby detects as a gap the picture element for which the back flag is found between the front flags, and in the following step SP4, fills up the gap with the interpolating data obtained by the interpolating calculation.

Figure 15:
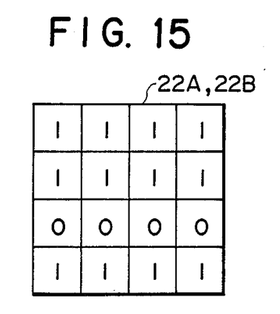
FIGS. 15 to 17 are schematic diagrams showing data processing operations in the gap detection and interpolation circuit.

The reason why the gap detection is made not only in the horizontal direction but also in the vertical direction in the steps SP1 and SP3 is because, in the case where the picture elements of the logical "0" level, which indicates that the corresponding picture element is a gap, continue in the horizontal direction (or vertical direction) as shown in FIG. 15, for example, there is a danger to judge them not to be gaps. More particularly, in judging whether or not a picture element is a gap, such a method is adopted here to decide, when a reversal of the contents of the data is detected in a train of flag data, the picture element corresponding to the reversed flag data to be a gap. And so, in the case where such a pattern as indicated in FIG. 15 is obtained, if the detection is made only in the horizontal direction, there is a danger to judge that there is no gap. By making the detection also in the vertical direction, such a misjudgment can be prevented from being made.

In the following step SP5, the gap detection and interpolation circuit 38 reads out the data in the input image address memory 22C first in the horizontal direction and then in the vertical direction and, if then there is a picture element whose address data is extremely different from others on the circumference, judges the same to be a gap and executes an interpolating calculation in the following step SP6 to fill up the gap with the interpolating data.

Figure 16:
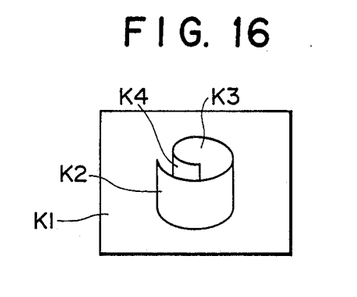
Figure 17:
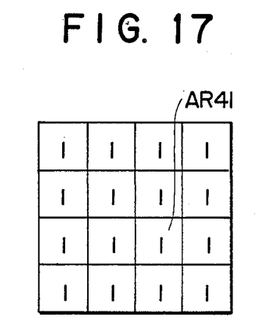

Now, supposing that a curved surface as shown in FIG. 16 formed by coiling a plane is selected as the three-dimensional curved surface to which a picture image is to be transformed, a picture image will be obtained wherein two surface portions K2 and K4 both being of the front side of the input picture image overlapping each other. Then, even if there is a gap in the memory area AR41 (FIG. 17) storing the front-side picture located toward the observer, the portion K2, there is stored a front flag data "1" of the front-side picture located away from the observer, the portion K4, and so, there is a danger that the gap AR41 may not be detected as a gap. However, since the address stored in the memory area of the input image address memory 22C corresponding to the gap AR41 is that of the front-side picture located away from the observer, the portion K4, the address must be far different from the addresses surrounding the same, namely, the addresses of the front-side picture located toward the observer or the portion K2. Thus, the gap detection and interpolation circuit 38 can certainly detect the gap according to the data in the input image address memory.

The gap detection and interpolation circuit 38 thus finishing detection of all the gaps and interpolating calculations therefor delivers the output video signal in the following step SP7. Incidentally, the interpolating calculations may be performed after the three types of gap detections by the use of the write flag memory 22A, the front/back flag memory 22B, and the input image address memory 22C have all been carried out.

According to the above described embodiment, when gaps are produced while executing the calculation to mount a two-dimensional plane on a polygon-simulated three-dimensional curved surface, the apparatus is adapted to detect the gaps and make interpolating calculations only for the detected gaps, and so, an output video signal in which the gaps are interpolated can certainly be obtained without the need for making the hardware structure so large. Therefore, even if such a class of special purpose hardware is used as to execute calculations using data of such smaller bit numbers that will unavoidably produce some gaps in the course of the calculation for mounting a two-dimensional plane on the polygon-simulated three-dimensional curved surface, high accuracy, in practice, can be provided. Thus, through high-speed calculation by the use of this apparatus, it has been made practicable to execute high-accuracy calculations on a real time basis.

According to the present invention as described above, it is adapted such that a virtual light source is disposed in a certain position with reference to a three-dimensional output picture image and weighting factors for quantifying the shading to be produced by the virtual light source are obtained based on the normal vector from the planes including respective sample points and the direction vectors from the same to the light source. Thereby, the output picture image is provided with the shading. Thus, when a two-dimensional plane picture image is transformed into a three-dimensional picture image, the same, even if it is a description of nature or a still picture, can be made to be displayed without its stereoscopic effect weakened.

Further, when some gaps are produced in the process of mounting a two-dimensional plane on a three-dimensional polygon-simulated curved surface, it is adapted that these gaps can be certainly detected and interpolated with appropriate data. Thus, an image transformation apparatus capable of image transformation with high accuracy on a real time basis has been made to be readily embodied without making the volume of the hardware so large.

What is claimed is:

1. A method of transforming a two-dimensional input video image data onto a three-dimensional surface comprising the steps of:
   (A) defining said three-dimensional surface;
   (B) providing mapping data for transforming said two-dimensional input video image data onto said surface;
   (C) storing said two-dimensional input video image data in a first memory means;
   (D) transforming said two-dimensional input video image data stored in said first memory means according to said mapping data so as to provide a two-dimensional output video image data;
   (E) calculating first vectors respectively representing normal vectors of minute areas provided on said surface;
   (F) calculating second vectors respectively representing directions from said minute areas toward an imaginary light source disposed at an arbitrary position;
   (G) calculating values of an inner product of said first and said second vectors;
   (H) calculating weighting factors according to said values of said inner products of said first and said second vectors calculated in step (G), said weighting factors respectively respresenting shading on said minute areas caused by said imaginary light source; and
   (I) weighting a signal representative of said two-dimensional input video image data according to said weighting factors, whereby both luminescence and hue components of said signal are changed according to said weighting factors.

2. A method of transforming a two-dimensional input video image data onto a three-dimensional surface according to claim 1, further comprising a step of setting the position of said imaginary light source.

3. A method of transforming a two-dimensional input video image data onto a three-dimensional surface according to claim 1, wherein said step (E) comprises the steps of (1) calculating normal vectors of said minute areas provided on said surface, (2) calculating front-/back flags of said minute areas provided on said surfaces and (3) multiplying said normal vectors and said front/back flags.

4. A method of transforming a two-dimensional input video image data onto a three-dimensional surface according to claim 1, further comprising a step of storing said weighting factors in a second memory means.

5. A system for transforming a two-dimensional input video image data onto a three-dimensional surface comprising:
   (A) means for defining said three-dimensional surface;
   (B) means for providing mapping data for transforming said two-dimensional input video image data onto said surface;
   (C) first memory means for storing said two-dimensional input video image data;
   (D) means for transforming said two-dimensional input video image data stored in said first memory means according to said mapping data so as to output a two-dimensional video image data;
   (E) second memory means for storing weighting factors representing shading on said surface caused by an imaginary light source disposed at an arbitrary position, said weighting factors being provided by calculation according to first vectors respectively representing normal vectors of minute areas provided on said surface and second vectors respectively representing directions from said minute areas toward said imaginary light source and calculating an inner product of said first and second vectors; and
   (F) means for weighting a signal representative of said input video image data or said input video image data according to said weighting factors whereby both luminescence and hue components of said signal are changed according to said weighting factors.

6. A system for transforming a two-dimensional input video image data onto a three-dimensional surface comprising:
   (A) means for defining said three-dimensional surface;
   (B) means for providing mapping data for transforming said two-dimensional input video image data onto said surface;
   (C) first memory means for storing said two-dimensional input video image data;
   (D) means for transforming said input video image data stored in said first memory means according to said mapping data so as to provide a two-dimensional output video image data;
   (E) means for detecting gap portions on said output video image data according to said mapping data when no properly transformed video image data exists.

7. A system for transforming a two-dimensional input video image data onto a three-dimensional surface according to claim 6, further comprising second memory means for storing gap data according to said mapping data, said detected gap portions being processed in response to said gap data system.

8. A system for transforming a two-dimensional input video image data onto a three-dimensional surface according to claim 7, wherein said second memory means including a first flag memory in which write flag data are stored corresponding to said output video image data, each of said write flag data being representative of existence of each of said output video image data.

9. A system for transforming a two-dimensional input video image data onto a three-dimensional surface according to claim 7, wherein said second memory means including a second flag memory in which front/back flag data are stored corresponding to said output video image data, each of said front/back flag data indicating whether the front side or the back side of the input video image is transformed onto said surface.

10. A system for transforming a two-dimensional input video image data onto a three-dimensional surface according to claim 7 wherein said second memory means including a third flag memory in which address data of said input video image on said first memory means corresponding to said input video image are stored.

11. A method of transforming a two-dimensional input video image data onto a three-dimensional surface according to claim 1, wherein said weighting factors calculated in the step (H) have a maximum and/or minimum value.

12. A system for transforming a two-dimensional input video image data onto a three-dimensional surface according to claim 5, further comprising means for setting the position of said imaginary light source.

13. A system for transforming a two-dimensional input video image data onto a three-dimensional surface according to claim 5, further comprising means for weighting a digital representation of said input video image signal.

14. A system for transforming a two-dimensional input video image data onto a three-dimensional surface according to claim 5, wherein said second memory means comprises:
 (a) means for calculating normal vectors of said minute areas provided on said surface;
 (b) means for calculating front/back flags of said minute areas; and
 (c) means for calculating an inner product of said first and second vectors.

15. A system for transforming a two-dimensional input video image data into a three-dimensional surface as set forth in claim 6, further including means for interpolating video image data for said gap portions by calculation of video image data on the circumference of said gap portions.

16. The method of transforming a two-dimensional input video image data onto a three-dimensional surface according to claim 1, wherein said signal representative of said two-dimensional input video image data is a digital signal after A/D conversion of said input video image data.

17. The method of transforming a two-dimensional input video image data onto a three-dimensional surface according to claim 1, wherein said signal representative of said two-dimensional input video image data is said two-dimensional video image data.

18. The method of transforming a two-dimensional input video image data onto a three- dimensional surface wherein said two-dimensional input video image data has been transferred onto a three-dimensional surface according to predetermined mapping data so as provide three-dimensional video image data on said three-dimensional surface, comprising the steps of:
 (A) calculating first vectors respectively representing normal vectors of minute areas provided on said surface;
 (B) calculating second vectors respectively representing directions from said minute areas toward an imaginary light source disposed at an arbitrary position;
 (C) calculating values of an inner product of said first and second vectors;
 (D) calculating weighting factors according to said values of said inner product of said first and said second vectors calculated in steps (A) and (B), said weighting factors respectively representing said shading on said minute areas caused by said imaginary light source; and
 (E) weighting a signal representative of said two-dimensional input video image data according to said weighting factors whereby both luminescence and hue components of said signal are changed according to said weighting factors.

* * * * *